United States Patent [19]

Bearden

[11] Patent Number: 4,857,489
[45] Date of Patent: Aug. 15, 1989

[54] MOLTEN ALUMINUM RESISTANT CERAMIC FIBER COMPOSITION

[75] Inventor: James M. Bearden, Mexico, Mo.

[73] Assignee: A. P. Green Industries, Inc., Mexico, Mo.

[21] Appl. No.: 801,028

[22] Filed: Nov. 22, 1985

[51] Int. Cl.$^4$ .............................................. C04B 35/76
[52] U.S. Cl. ........................................ 501/95; 501/36; 501/125; 501/133
[58] Field of Search ............... 501/95, 36, 35, 123, 501/125, 133

[56] References Cited

U.S. PATENT DOCUMENTS

| | | | |
|---|---|---|---|
| 2,051,279 | 8/1936 | Thorndyke | 501/36 |
| 3,078,173 | 2/1963 | Dolph | 501/125 |
| 3,294,562 | 12/1966 | Caprio et al. | 501/124 |
| 3,754,948 | 8/1973 | Ash | 501/95 |
| 4,126,474 | 11/1978 | Talley et al. | 106/63 |
| 4,174,331 | 11/1979 | Myles | 260/29.1 R |
| 4,248,752 | 2/1981 | Myles | 260/29.1 R |
| 4,257,812 | 3/1981 | Johnson et al. | 501/95 |
| 4,334,931 | 6/1982 | Asaumi et al. | 106/120 |
| 4,510,253 | 4/1985 | Felice et al. | 501/95 |

FOREIGN PATENT DOCUMENTS

| | | | |
|---|---|---|---|
| 87762 | 9/1983 | European Pat. Off. | 501/123 |
| 575338 | 10/1977 | U.S.S.R. | 501/133 |
| 2149772 | 6/1985 | United Kingdom | 501/95 |

*Primary Examiner*—William R. Dixon, Jr.
*Assistant Examiner*—James M. Hunter, Jr.
*Attorney, Agent, or Firm*—Senniger, Powers, Leavitt & Roedel

[57] ABSTRACT

A moldable refractory composition comprising a ceramic alumina-silica fiber, a colloidal silica, an organic adhesive, wollastonite, and a liquid vehicle such as water forms a molten aluminum resistant refractory when dried.

12 Claims, No Drawings

MOLTEN ALUMINUM RESISTANT CERAMIC FIBER COMPOSITION

This invention relates to ceramic fiber compositions for use in contact with molten aluminum.

Moldable refractory compositions comprising ceramic fibers and binders are lightweight and highly insulating and have been used in transfer ladle covers and liners, troughs, spouts, distribution pans, launderers and filter boxes. They are also useful for patching cracks and voids in furnaces and as joint compounds between other refractory parts. Alumina-silica fibers constitute the fibrous portion of the more commonly used moldable ceramic fiber compositions but, for the most part, these have poor resistance to wetting and penetration by molten aluminum.

A moldable composition of ceramic fibers and colloidal silica is taught in U.S. Pat. Nos. 4,174,331 and 4,248,752. In U.S. Pat. No. 4,510,253, the addition of an aluminum boron slag, a by-product of the production of ferro-boron, to moldable composition of ceramic fibers and colloidal silica is taught to impart a resistance to attack by molten aluminum. Because it is a slag, the composition is variable. Aluminum borate is said to be the active phase of the slag. Alkali and alkaline earths are said to be unnecessary and undesirable constituents whose proportion should be kept as low as possible because of their negative effect on the refractoriness of the slag. Fluoride content must also be kept low because of possible adverse effects on the moldable refractory, according to the '253 patent.

In U.S. Pat. No. 2,997,402, a glassy material containing calcium oxide, boron oxide and aluminum oxide is taught to lend molten aluminum resistance to a refractory containing at least about 90% alumina.

It is an object of this invention to provide a moldable fibrous refractory material in which a commonly used ceramic fiber having an alumina content of about 50% is protected by an alkaline earth silicate against molten aluminum.

It is a further object of this invention to provide a molten aluminum resistant ceramic fiber refractory material in which said resistance is imparted by a naturally occurring mineral having a reliable composition.

These and other objects of this invention which will become apparent from the following disclosure are achieved by a refractory composition comprising from about 8.9 to about 38% ceramic fiber, from about 9.8 to about 23% colloidal silica (dry), from about 3.5 to about 10% wollastonite, from about 0.6 to about 2% organic adhesive, and from about 30 to about 65% liquid vehicle, by weight.

The term "ceramic fiber" for the purposes of this invention means an alumina-silica fiber having an alumina content of from about 49 to about 50% by weight and, preferably, one in which the alumina and silica content are equal. Thus, the invention is directed to the more commonly used aluina-silica ceramic fibers rather than to the more highly refractory fibers having a high alumina content. It is still the ceramic fiber, however, that is responsible for the refractory properties of the molded and cured composition of this invention. A high purity aluminosilicate fiber sold by A. P. Green Refractories Company under the INSWOOL HP trademark is an example of the preferred ceramic fiber for this invention. Its upper service temperature is 2400° F. (1315° C.). The proportion of ceramic fiber in the moldable composition is preferably from about 10 to about 35% and, more preferably, from about 12% to about 25%. The fiber is chopped or hammermilled to give an average length of from about one-fourth inch to about 1 inch.

The colloidal silica acts as a thickening agent in the aqueous moldable compositions and as a binder in the dried, cured, and molded refractory. The silica, therefore, is preferably amorphous, having an average particle size of from about 12 to about 15 millimicrons and a large surface area. Ludox HS-40 colloidal silica, an aqueous dispersion containing 40% silica by weight and sold by E. I. du Pont de Nemours & Company, is an example of a preferred component of the moldable compositions. The average particle size is from about 13 to about 14 millimicrons and its surface area is about 230 $m^2$/gram. Other colloidal silicas capable of performing as a thickener and binder may be used. A pyrogenic silica having a surface area of about 200 $m^2$/gram sold under the trademark CAB-O-SIL by the Cabot Corporation is an example of a dry colloidal silica that may be used but an aqueous dispersion is preferred since the moldable composition is prepared by mixing the fiber and other components with water from one source or another. If the aqueous colloidal dispersion does not contain enough water to make a workable composition when the fiber and wollastonite are added, the mixture may be thinned out by adding diluent water. Preferably, the colloidal silica amounts from about 15 to about 21% of the total composition; more preferably it is from about 16 to about 20% thereof.

The amount of wollastonite is preferably from about 5 to about 9%. The mechanism by which the wollastonite protects the cured refractory against attack by molten aluminum is not thoroughly understood but the surface of the cured refractory is non-wettable by the liquid aluminum. A fine grade or paint grade of the mineral is preferred. A 325 mesh material exemplifies the particle size.

The preferred adhesive is a high molecular weight, anionic copolymer of acrylamide such as the one sold by the Nalco Chemical Company under the trademark Nalco 2332. Said polymer is provided as a 30% solution in a hydrocarbon solvent. A solid homopolymer having a molecular weight of about one million sold under the trademark Reten 420 by Hercules Powder Company, Inc. is also useful. Polyethylene glycol and mixtures thereof with acrylamide polymers may also be used as the adhesive. The range for the amount of adhesive is based on the solids content of the commercial polymer compositions. To prolong shelf life, it is preferred that the amount of adhesive is not greater than about 2.4% of the total weight of liquid in the composition. The organic adhesive thickens the moldable refractory composition and holds it in place on the metal parts of a furnace.

Water is the preferred liquid vehicle because of its ready availability, ease of evaporation and inertness. Ethylene glycol or propylene glycol may be added to the moldable composition to protect it against freezing and the resulting separation of the colloidal silica in the thawed material. The amounts of water and other liquid in the colloidal silica dispersion and the polymer solution are included along with added water in the calculation of the weight percentage in the moldable composition. A preferred amount is from about 35 to about 60%; more preferably it is from about 45 to about 60% of the total weight. A putty-like consistency is preferred for the moldable composition so that it may be hand molded into the desired shape.

The composition is prepared in a mixer that has a folding action such as a Hobart or a Day mixer. The fiber and colloidal silica dispersion are mixed until the fiber is thoroughly wetted, then the wollastonite is mixed in. The adhesive material is then added and thoroughly dispersed. Water, with or without an antifreeze material, is added to the mixture while mixing continues until a putty-like composition is obtained.

EXAMPLE 1

Forty parts by weight of a hammermilled ceramic fiber (INSWOOL HP) were mixed in a Hobart mixer with 50 parts by weight of an aqueous colloidal silica dispersion (40% solids, Ludox HS40) until the fibers were wetted. Ten parts by weight of wollastonite (NYAD 325, NYCO Division of Processed Minerals, Inc.) were then mixed into and wetted by the fiber-silica mix. Five parts by weight of a solution of a polyacrylamide (30% solids, Nalco 2332) were then added and thoroughly dispersed in the moist fibrous mixture. Upon the addition of ten parts by weight of water, a composition having a putty-like consistency was obtained.

EXAMPLE 2

The procedure of Example 1 was followed in general except that 13.8 parts of a less severely hammermilled ceramic fiber, 49.3 parts of the colloidal silica dispersion, 5.9 parts of the wollastonite, 3.4 parts of the acrylamide polymer solution, and 27.6 parts of added water were used. The average length of the ceramic fibers is longer than in Example 1 because of the less severe milling.

Test boards measuring 8"×10"×1.5" were formed from the compositions of Examples 1 and 2 and air dried while in the mold at ambient temperatures. The boards were then cured at 220° F. overnight. No shrinking or cracking of the boards occurred. The boards were cut into 8"×3"×1.5" strips for testing of the cured compositions as such and then after the strips had been reheated to 1500° F. and to 2000° F. The resistance to molten aluminum was measured by an immersion test wherein the boards were preheated at a rate of 300° F./hour to 1000° F. and held there for one hour and then immersed in molten 7075 aluminum alloy (1400° F.) to three-quarters of their length. After 24 hours of immersion, the boards are removed from the molten metal and allowed to cool. The surfaces of the boards are examined for adhering metal and then they are put through the heating and immersion steps a second time. The boards are sawed in half and examined for signs of reaction with or penetration by the metal.

The test results for the product of Examples 1 and 2 and for test strips made from a moldable composition sold under the trademark PYROFOAM by The Carborundum Company, the assignee of U.S. Pat. Nos. 4,174,331 and 4,248,752, are given in the following table.

|  | Example No. | | |
| --- | --- | --- | --- |
|  | 1 | 2 | Pyrofoam |
| Bulk density (lbs./cu. ft.) | | | |
| Cured composition | 60 | 46 | 61 |
| After 1500° F. reheat | 57 | 43 | 64 |
| After 2000° F. reheat | 62 | 51 | 69 |

-continued

|  | Example No. | | |
| --- | --- | --- | --- |
|  | 1 | 2 | Pyrofoam |
| Apparent porosity (%) | | | |
| Cured composition | 58 | — | 55 |
| After 1500° F. reheat | 62 | — | 57 |
| After 2000° F. reheat | 60 | — | 55 |
| Modulus of rupture (psi) | | | |
| Cured composition | 35 | 146 | 260 |
| After 1500° F. reheat | 20 | 49 | 265 |
| After 2000° F. reheat | 130 | 129 | 250 |
| Molten Aluminum resistance* | | | |
| Cured composition | 1 | — | 3 |

*1 = no penetration
3 = extensive penetration

The organic adhesive decomposes rather quickly at the high service temperatures encountered by the molded and cured refractory composition, the residue of fiber, silica, and wollastonite being the effective refractory thereafter. Preferably, said residual refractory composition comprises from bout 25.9% to about 57.1% ceramic fiber, from about 22.3% to about 62.2% colloidal silica, and from about 11.9% to about 15.6% wollastonite. The product of Example 1, exclusive of the acrylamide polymer, comprises about 57.1% ceramic fiber and is thus on high end of the preferred fiber range; it also comprises about 28.6% colloidal silica and about 14.3% wollastonite. The product of Example 2, when stripped of its organic adhesive, comprises about 35.1% ceramic fiber, about 50% colloidal silica, and about 14.9% wollastonite and is preferred over that of Example 1 when higher strength is desired.

The subject matter claimed is:

1. A moldable refractory composition comprising a ceramic fiber, a colloidal silica, wollastonite, an organic adhesive, and a sufficient amount of liquid vehicle to give the composition a putty-like consistency, wherein the wollastonite is from about 3.5% to about 10% of the total weight of the composition.

2. The composition of claim 1 wherein the ceramic fiber is from about 8.9% to about 38%, and the colloidal silica is from about 9.8% to about 23% of the total weight.

3. The composition of claim 2 wherein the adhesive is from about 0.6% to about 2%, and the liquid vehicle is from about 30% to about 65% of the total weight.

4. The composition of claim 1 wherein it comprises:
   (a) from about 10% to about 35% ceramic fiber;
   (b) from about 15% to about 21% colloidal silica;
   (c) from about 5% to about 9% wollastonite;
   (d) from about 0.6% to about 2% adhesive; and
   (e) from about 35% to about 60% liquid vehicle.

5. The composition of claim 1 wherein it comprises:
   (a) from about 12% to about 25% ceramic fiber;
   (b) from about 16% to about 20% colloidal silica;
   (c) from about 5% to about 9% wollastonite;
   (d) from about 0.6% to about 2% adhesive; and
   (e) from about 45% to about 60% liquid vehicle.

6. The composition of claim 4 wherein the adhesive is not more than about 2.4% of the weight of the liquid vehicle.

7. A molten aluminum-resistant refractory comprising a ceramic fiber, a colloidal silica, and wollastonite, wherein the wollastonite is from about 11.9% to about 15.6% of the composition.

8. The composition of claim 7 wherein it comprises, by weight:

(a) from about 25.9 to about 57.1% ceramic fiber;

(b) from about 22.3 to about 62.2% colloidal silica; and (c) from about 11.9 to about 15.6% wollastonite.

9. The composition of claim 8 wherein it comprises about 35.1% ceramic fiber, about 50% colloidal silica, and about 14.9% wollastonite.

10. The composition of claim 8 wherein it comprises about 57.1% ceramic fiber, about 28.6% colloidal silica, and about 14.3% wollastonite.

11. The composition of claim 1 wherein it comprises about 13.8% ceramic fiber and about 5.9% wollastonite, by weight.

12. The composition of claim 1 wherein it comprises about 34.8% ceramic fiber and about 8.7% wollastonite, by weight.

* * * * *